(12) United States Patent
Yamane

(10) Patent No.: US 12,056,711 B2
(45) Date of Patent: *Aug. 6, 2024

(54) FRAUD PREVENTION VIA BENEFICIARY ACCOUNT VALIDATION

(71) Applicant: Wells Fargo Bank, N.A., San Francisco, CA (US)

(72) Inventor: Marcus Yamane, San Anselmo, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/197,400

(22) Filed: May 15, 2023

(65) Prior Publication Data

US 2023/0342784 A1    Oct. 26, 2023

Related U.S. Application Data

(63) Continuation of application No. 16/383,196, filed on Apr. 12, 2019, now Pat. No. 11,651,372.

(51) Int. Cl.
 *G06Q 20/40*    (2012.01)
 *G06Q 20/10*    (2012.01)

(52) U.S. Cl.
 CPC ....... *G06Q 20/4016* (2013.01); *G06Q 20/108* (2013.01); *G06Q 20/4014* (2013.01)

(58) Field of Classification Search
 CPC ............ G06Q 20/4016; G06Q 20/108; G06Q 20/4014

USPC .......................................................... 705/75
See application file for complete search history.

(56) References Cited

U.S. PATENT DOCUMENTS

| | | |
|---|---|---|
| 7,231,068 B2 | 6/2007 | Tibor |
| 7,395,241 B1 | 7/2008 | Cook et al. |
| 7,574,405 B2 | 8/2009 | Rallo et al. |
| 8,374,961 B2 | 2/2013 | Vancini et al. |
| 8,682,766 B1 | 3/2014 | Blowers |
| 9,996,825 B1 | 6/2018 | Casey et al. |
| 10,050,935 B2 | 8/2018 | Hansen |
| 10,410,190 B1 | 9/2019 | Kapoor et al. |
| 10,482,449 B1 | 11/2019 | Gantert |
| 2002/0032665 A1 | 3/2002 | Creighton et al. |
| 2006/0229961 A1 | 10/2006 | Lyftogt et al. |
| 2007/0255662 A1 | 11/2007 | Tumminaro |

(Continued)

FOREIGN PATENT DOCUMENTS

WO    WO-2015/176105 A1    11/2015
WO    WO-2015176105 A1 *  11/2015  ............. G06Q 20/40

*Primary Examiner* — Courtney P Jones
(74) *Attorney, Agent, or Firm* — Foley & Lardner LLP

(57) ABSTRACT

Disclosed are methods, systems, and devices for preventing payments to unintended beneficiaries. A service provider system may receive, from a user device of a user, a payment request to transfer funds from a source account to an identified destination account. A beneficiary system may be identified, and a validation request (e.g., an API call) may be transmitted to the beneficiary system. The service provider system may receive from the beneficiary system a transmission indicating whether the destination account is associated with the recipient identified in the payment request. The user may be alerted if the account number for the destination account is not validated.

20 Claims, 6 Drawing Sheets

(56) References Cited

U.S. PATENT DOCUMENTS

| | | |
|---|---|---|
| 2008/0249951 A1 | 10/2008 | Gilder et al. |
| 2009/0006250 A1 | 1/2009 | Bixler et al. |
| 2009/0119190 A1 | 5/2009 | Realini |
| 2014/0156512 A1 | 6/2014 | Rahman et al. |
| 2015/0081553 A1 | 3/2015 | Smith |
| 2015/0106246 A1 | 4/2015 | Krishna |
| 2015/0213418 A1 | 7/2015 | Gurz et al. |
| 2015/0379615 A1 | 12/2015 | Dhar et al. |
| 2016/0014076 A1 | 1/2016 | Hansen |
| 2016/0162688 A1 | 6/2016 | Call et al. |
| 2016/0283918 A1 | 9/2016 | Weinflash |
| 2017/0357956 A1 | 12/2017 | Borkar |
| 2018/0053160 A1 | 2/2018 | Schwartz et al. |
| 2018/0082368 A1* | 3/2018 | Weinflash ........... G06Q 20/4016 |
| 2018/0308099 A1* | 10/2018 | Binns ................. G06Q 20/4016 |
| 2020/0013028 A1 | 1/2020 | Black et al. |
| 2020/0211098 A1 | 7/2020 | Miyamoto et al. |
| 2020/0279235 A1 | 9/2020 | Booth et al. |
| 2020/0311728 A1* | 10/2020 | Jain ..................... G06F 16/2379 |
| 2020/0327583 A1 | 10/2020 | Glenn |
| 2021/0365942 A1 | 11/2021 | Williams |

\* cited by examiner

FRAUD PREVENTION VIA BENEFICIARY ACCOUNT VALIDATION

CROSS-REFERENCE TO RELATED APPLICATIONS

This application is a continuation of U.S. patent application Ser. No. 16/383,196 filed Apr. 12, 2019, the entirety of which is incorporated herein by reference.

TECHNICAL FIELD

The present disclosure relates to beneficiary account verification and validation using, for example, application programming interfaces (APIs), prevention of fraud perpetrated via payment requests that impersonate legitimate beneficiaries, and avoidance of payments to unintended beneficiaries.

BACKGROUND

Electronic communications and payments have exposed new vulnerabilities that can be exploited by fraudsters. Scammers are able to infiltrate the computing system of an entity and use the compromised computing system to generate e-mails (or other electronic messages) to ask for a payment. The e-mails appear genuine, as they originate from the e-mail account of the entity, and are thus less likely to be identified as a scam. The e-mails claim the funds are for the benefit of the entity being impersonated, but provide an account number for an account of the scammer and ask for a transfer of funds into the identified account. Scammers may also rapidly and in large numbers send electronic communications that copy and incorporate the visual elements (such as names, logos, etc., which may be readily available on the Internet) of other entities to impersonate the other entities and thereby appear legitimate. As with the electronic messages sent via compromised computing systems, such electronic communications may request a payment and, ostensibly for the convenience of the user, provide an account number of the imposter for the transfer of funds.

The user may then access his or her account to request payment to the identified account. Because the user initiates payment himself/herself via legitimate channels, the service provider system receiving the request for payment accepts the payment request and subsequently initiates a transfer of funds into the account (of the scammer) as entered by the user. The impersonated entity does not receive funds intended for it, and the user no longer has the funds available for legitimate payments.

SUMMARY

Various embodiments of the disclosure relate to a service provider system. The service provider system may detect potential scams. The service provider system may comprise a network interface configured to communicate via a telecommunications network. The service provider system may also comprise a processor and a memory having stored thereon instructions that, when executed by the processor, cause the processor to perform specific functions. The instructions may cause the service provider system to accept a payment request. The payment request may be accepted from a user device. The payment request may be accepted via the network interface. The payment request may be to transfer funds from a source account to a destination account. The payment request may be submitted by a user via a payment application or browser running on the user device. The payment request may include an account number corresponding to the destination account. The instructions may also cause the service provider system to identify a beneficiary system of an intended beneficiary. The beneficiary system may be identified based at least in part on the payment request. The beneficiary system may have an account validation API. The instructions may moreover cause the service provider system to submit a validation request to the beneficiary system. The validation request may be submitted via the network interface. The validation request may be an API call. The validation request may include the account number in the payment request. The instructions may additionally cause the service provider system to receive a transmission from the beneficiary system. The transmission may be received via the network interface. The transmission may indicate whether the account number is associated with the intended beneficiary. The instructions may further cause the service provider system to transmit an alert or other notification in response to receiving the transmission. The alert or other notification may be transmitted to the user device via the network interface. The alert or other notification may be transmitted in an instance in which the account number is not associated with the intended beneficiary.

In one or more implementations, the instructions, when executed by the processor, may further cause the processor to determine that the received transmission indicates that the account number is not associated with the intended beneficiary. The instructions, when executed by the processor, may further cause the processor to generate the alert so as to indicate that the account number in the payment request is not associated with the intended beneficiary.

In one or more implementations, the instructions, when executed by the processor, further cause the processor to, in a second instance in which the account number is associated with the intended beneficiary, transmit, to the user device via the network interface, a notification that indicates that the account number in the payment request is associated with the intended beneficiary.

In one or more implementations, the instructions, when executed by the processor, may further cause the processor to include an authentication credential in the API call or other validation request. The authentication credential may be of the service provider system. The authentication credential may be a security token. The security token may be generated by the beneficiary system and/or the service provider system. The security token may be for use in authenticating the service provider system with the beneficiary system.

In one or more implementations, the instructions, when executed by the processor, may further cause the processor to determine that the destination account is not sufficiently certain to belong to the intended beneficiary before submitting the API call to the beneficiary system. The instructions may cause the processor to determine that the destination account is not sufficiently certain to belong to the intended beneficiary based at least in part on a determination that funds have not previously been transferred from the source account to the destination account in a prior payment request.

In one or more implementations, the payment request may provide identification information for a recipient. The instructions, when executed by the processor, may further cause the processor to identify the intended beneficiary based at least in part on similarity or match between the identification information for the recipient and identification information for the intended beneficiary.

In one or more implementations, the recipient identification information may include a recipient name and a recipient address. The instructions may cause the processor, when executed by the processor, to identify the intended beneficiary based on similarity or match between the recipient name and an intended beneficiary name. Alternatively or additionally, the instructions, when executed by the processor, may cause the processor to identify the intended beneficiary based on similarity or match between the recipient address and an intended beneficiary address.

In one or more implementations, the instructions, when executed by the processor, may cause the processor to determine that the transmission received from the beneficiary system indicates that the account number is not associated with the intended beneficiary. The instructions, when executed by the processor, may further cause the processor to indicate, such as in the alert transmitted to the user device, that the account number in the payment request is not associated with the intended beneficiary.

Various embodiments of the disclosure relate to a method. The method may prevent fraud. The method may comprise receiving a payment request to transfer funds from a source account to a destination account. The payment request may be received from a user device of a user. The payment request may be submitted by the user via a payment application and/or browser running on the user device. The payment request may include an account number for the destination account and/or identification information for a recipient. The method may also comprise identifying a beneficiary system with an API for verifying account numbers. The beneficiary system may be identified based at least in part on the payment request. The method may moreover comprise transmitting a validation request, such as an API call, to the beneficiary system. The API call or other validation request may include the account number received in the payment request. The method may additionally comprise receiving a transmission indicating whether the destination account is associated with the recipient identified in the payment request. The transmission may be received from the beneficiary system. The transmission may be received in response to the API call or other validation request. The method may further comprise transmitting to the user device an alert. The alert may be transmitted in response to receiving the transmission. The alert may be transmitted in an instance in which the destination account is not associated with the recipient identified in the payment request. The alert may be presented via the payment application and/or browser.

In one or more implementations, the transmission from the beneficiary system may be determined to indicate that the destination account is not associated with the recipient. The alert may be generated so as to indicate that the destination account identified in the payment request is not associated with the recipient.

In one or more implementations, a notification that indicates that the destination account is associated with the recipient may be transmitted to the user device. The notification may be transmitted in a second instance in which the destination account is associated with the recipient identified in the payment request. The user may be informed via the payment application or browser that the destination account is associated with the recipient.

In one or more implementations, the payment request may be submitted in response to a communication transmitted to the user device. The communication may request funds. The communication may include the account number for the destination account. The communication may be transmitted to the user device by a device of an entity impersonating the recipient. In one or more implementations, the payment request may be initiated via a link in the communication. The link may cause the user device to launch the payment application and/or direct the user to a website. The link may prefill the account number into a payment request page. The payment request page may be presented via the payment application and/or the website.

In one or more implementations, the method may comprise determining whether funds have previously been transferred from the source account to the destination account in a prior payment request. The beneficiary system may be identified for transmission of the API call in response to a determination that funds have not previously been transferred from the source account to the destination account.

Various embodiments of the disclosure relate to a method. The method may avoid unintended transactions. The method may comprise receiving an account number for a destination account to receive funds. The method may also comprise receiving an identification of an intended beneficiary. The account number and/or identification of the intended beneficiary may be received from a user device of a user. The account number and intended beneficiary may have been entered by the user into a payment request. The account number and intended beneficiary may have been entered into fields of the payment request. The account number and/or the intended beneficiary may be transmitted by the user device when at least one field in the payment request is unfilled. The method may moreover comprise transmitting a validation request to a beneficiary system corresponding to the intended beneficiary. The validation request may include the account number. The method may additionally comprise receiving a transmission from the beneficiary system. The transmission may indicate whether the destination account is associated with the intended beneficiary. The transmission may be generated by the beneficiary system based at least in part on the account number in the validation request. The method may further comprise determining that the transmission indicates that the destination account is not associated with the intended beneficiary. The method may furthermore comprise transmitting a notification or other communication to the user device. The notification or other communication may be transmitted in response to determining that the transmission indicates that the destination account is not associated with the intended beneficiary. The notification or other communication may cause the user device to present an alert to the user. The alert may indicate a failure to validate the destination account.

In one or more implementations, the method further comprises determining that the transmission indicates that the destination account is not associated with the intended beneficiary. The method may also further comprise generating the notification so as to cause the user device to alert the user of a failure to validate the destination account.

In one or more implementations, the validation request is an API call to the beneficiary system.

In one or more implementations, the method further comprises determining that funds have not previously been transferred from the source account to the destination account via a prior payment request of the user. The validation request may be transmitted to the beneficiary system in response to determining that funds have not previously been transferred from the source account to the destination account.

In one or more implementations, an actual beneficiary may have impersonated the intended beneficiary in an electronic solicitation to the user device. The electronic solicitation may have identified the intended beneficiary. The electronic solicitation may have included the account number. The destination account may be associated with the actual beneficiary. The payment request may be initiated via a link in the electronic solicitation. The link may cause the user device to (i) launch a payment application, and/or (ii) present a payment website via an Internet browser.

These and other features, together with the organization and manner of operation thereof, will become apparent from the following detailed description and the accompanying drawings.

DETAILED DESCRIPTION

Various embodiments described herein relate to systems and methods for reducing fraud in the digital realm. A user may attempt to make an electronic payment with funds from a source account (e.g., an account of the user) to a destination account (e.g., an account of an imposter). The electronic payment may be requested via a service provider system (which may, e.g., administer the source account) using an Internet browser or other application running on a user device. The service provider system may determine that there is insufficient certainty that the actual recipient of the funds would be the intended beneficiary if, for example, funds have not previously been transferred from the source account to the identified destination account. The service provider system may transmit a request for validation (e.g., an API call) to a system of the intended beneficiary and/or to a validation system. The request for validation may include the account number of the destination account. The validation request may be transmitted by the service provider system while the user is submitting payment instructions via his or her user device, helping the service provider system validate in the background to minimize delays in the process.

The relative ease with which users are able to make electronic payments increases the success rate of scams. Users may be able to easily copy and paste the account numbers of imposters into a website or an application that allows for electronic payments. Deceitful communications can also provide activatable links that reduce the number of steps needed for the user to make the requested payment. The links, when selected, may cause the user device to launch an application or open a webpage, and potentially may prefill the account number of the imposter into the payment request. The efficiencies and conveniences of the digital realm enable sham payments in less time and with less effort, thereby increasing their prevalence. When the user makes a payment based on the deceitful communication, he or she may use a legitimate mechanism (e.g., an application or website providing access to the user's account) to transfer funds to the scammer's account (rather than an account of the intended beneficiary), allowing such payments to routinely go undetected. This disclosure provides efficient, convenient mechanisms for preventing such fraud that victimizes the entities being impersonated as well as the users making payments.

Figure 1:
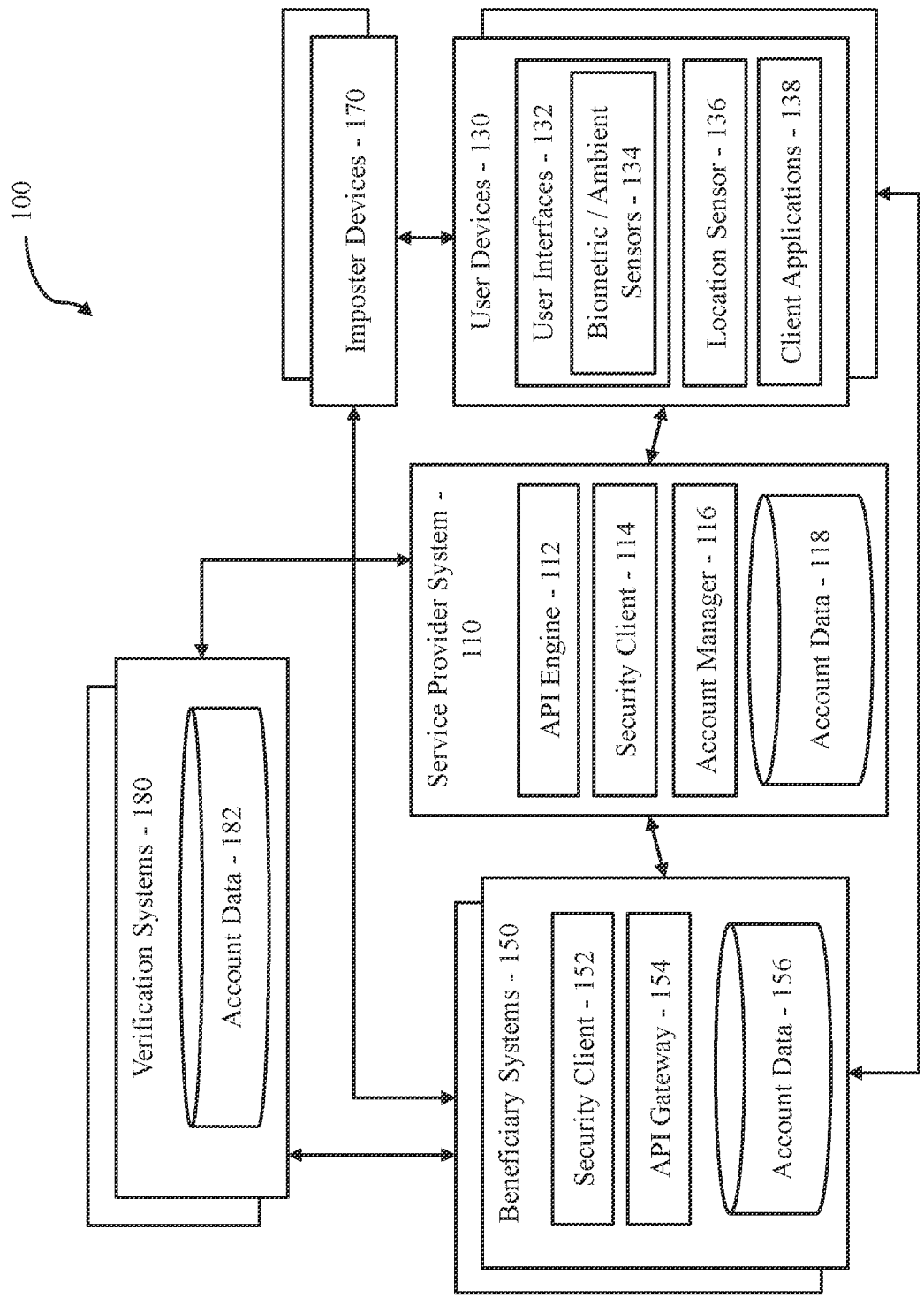
FIG. 1 is a block diagram of an example computer-implemented system, with a service provider system in communication with various systems and devices, according to potential embodiments.

Referring to FIG. 1, a block diagram of an example system 100 enabling efficient payment with account validation that has little or no impact on the user experience, according to potential embodiments, is shown. The system 100 includes a service provider system 110 (e.g., a system of a financial institution or other service provider), which may be implemented using one or more computing devices. The system 100 may also include one or more user devices 130, one or more beneficiary systems 150, one or more imposter devices 170, and one or more verification systems 180. The components of the system 100 may be communicably and operatively coupled to each other over a network that permits the direct or indirect exchange of data, values, instructions, messages, and the like (represented by the double-headed arrows in FIG. 1).

Each device in system 100 may include one or more processors, memories, network interfaces, and user interfaces. The memory may store programming logic that, when executed by the processor, controls the operation of the corresponding computing device. The memory may also store data in databases. The network interfaces allow the computing devices to communicate wirelessly or otherwise. The various components of devices in system 100 may be implemented via hardware (e.g., circuitry), software (e.g., executable code), or any combination thereof.

Beneficiary system 150 may include an API gateway 154 to allow other systems and devices to interact with beneficiary system 150 via various APIs, such as APIs that facilitate authentication, validation, data retrieval, etc. The beneficiary system 150 may provide various functionality to other devices through APIs. Generally, an API is a software-to-software interface that allows a first computing system of a first entity to utilize a defined set of resources of a second (external) computing system of a second (third-party) entity to, for example, access certain data and/or perform various functions. In such an arrangement, the information and functionality available to the first computing system is defined, limited, or otherwise restricted by the second computing system. To utilize an API of the second computing system, the first computing system may make an API call to the second computing system. The API call may be accompanied by a security or access token or other data to authenticate the first computing system and/or a particular user. The API call may also be accompanied by certain data/inputs to facilitate the utilization or implementation of the resources of the second computing system, such as data identifying users, accounts, dates, functionalities, tasks, etc. In system 100, beneficiary system 150 may accept or receive API calls via API gateway 154.

In various implementations, requests/transmissions from service provider system 110 to beneficiary systems 150 may be in the form of API calls from the service provider system 110 (generated, e.g., via API engine 112, which may utilize APIs to communicate with other devices and systems and provide various functionality) and received by the beneficiary system 150 (via, e.g., API gateway 154). Similarly, the service provider system 110 may, in some implementations, transmit validation requests to verification systems 180 using API calls to the verification systems 180 (which may also have API gateways). Such API calls may include or be accompanied by various data, such as account numbers and security tokens. In some implementations, the beneficiary system 150 (and/or verification system 180) may receive the API (or other mechanism enabling account verification) from the service provider system 110.

Service provider system 110 may moreover include a security client 114 which may provide fraud prevention measures and security protections (such as generation of security tokens, authentication of devices, verification of biometric or other security data, etc.). The service provider system 110 may also include an account manager 116 that may generate, update, and maintain account data 118 of users in one or more databases.

User devices 130 may also include one or more user interfaces 132, which may include one or more biometric sensors/ambient sensors 134. User interfaces 132 may include components that provide perceptible outputs (e.g., displays and light sources for visually-perceptible elements, a speaker for audible elements, and haptics for perceptible signaling via touch), that capture ambient sights and sounds (such as cameras and microphones), and that allow the user to provide inputs (e.g., a touchscreen, stylus, force sensor for sensing pressure on a display screen, and biometric components such as a fingerprint reader, a heart monitor that detects cardiovascular signals, an iris scanner, and so forth). One or more user devices 130 may include one or more location sensors 136 to enable the user device 130 to determine its location relative to, for example, other physical objects or relative to geographic locations. Example location sensors 136 include global positioning system (GPS) devices and other navigation and geolocation devices, digital compasses, gyroscopes and other orientation sensors, as well as proximity sensors or other sensors that allow the user device 130 to detect the presence and relative distance of nearby objects and devices. The user devices 130 may include applications 138, such as a client application provided or authorized by the entity implementing or administering the service provider system 110. Example service providers may include trusted entities such as banks or other financial institutions, which are highly incentivized to inspire trust, prevent fraud, and use verified data for authentication and for maintaining security.

Each beneficiary system 150 may moreover include a security client 152 which may provide fraud prevention measures and security protections (such as generation of security tokens, authentication of devices, verification of biometric or other security data, etc.). API gateway 154 may accept API calls from service provider system 110, which may generate the API calls via API engine 112. Beneficiary system 150 may include account data 156 (in one or more databases) to maintain data of users with which the beneficiary system 150 interacts and transacts, such as user accounts.

Alternatively or additionally to the account data 156 of beneficiary system 150, one or more verification systems 180 may maintain account data 182, which may be updated and/or managed by service provider system 110, beneficiary systems 150, and/or verification systems 180. In certain versions, verification systems 180 may include one or more systems and devices administered by one or more financial institutions and/or various other third party verification services. In various implementations, account data 182 may be one or more distributed ledgers maintaining, for example, account numbers for financial accounts (in association with the entities to which the accounts belong) across multiple financial institutions and/or for multiple beneficiaries. Account data 182 may be populated, at least in part, using data acquired via service provider system 110, beneficiary systems 150, and/or systems and devices of other entities (e.g., financial institutions, governmental entities, etc.).

Figure 2:
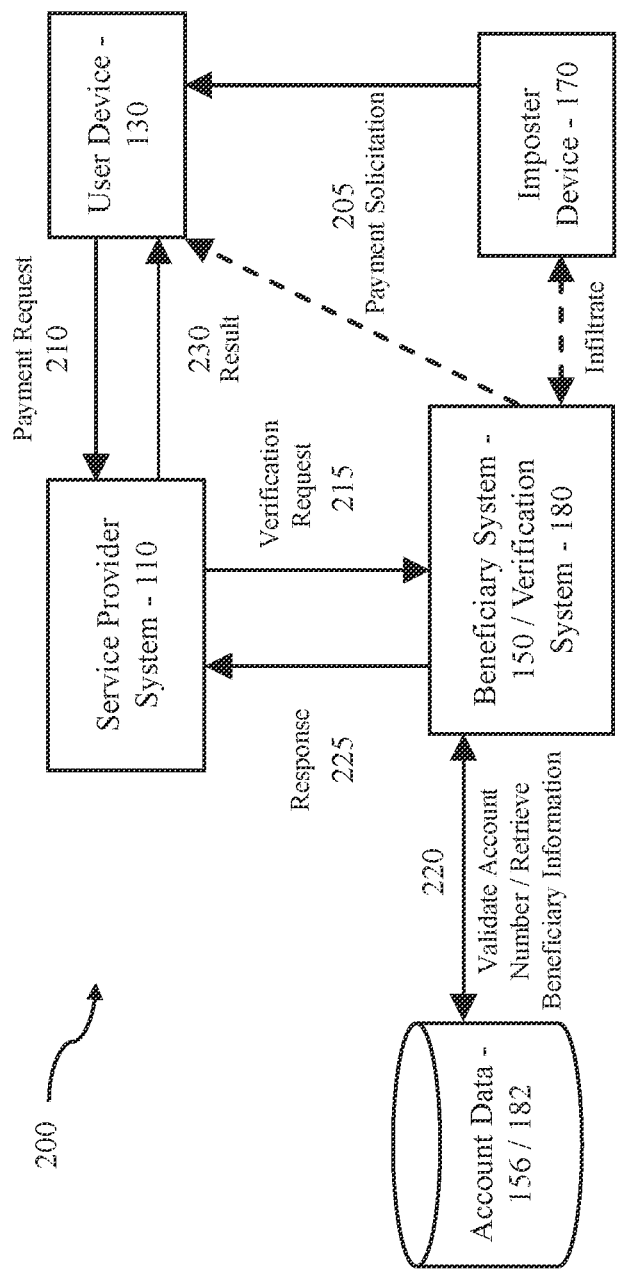
FIG. 2 depicts an example approach for validating payment requests, according to potential embodiments.

FIG. 2 provides an overview of an example approach 200 to the service provider system 110 processing payment requests from user devices 130, according to potential embodiments. At 205, a user device 130 receives an electronic communication that solicits a payment. In various implementations, the electronic communication may be an e-mail message or a text message. In some versions, the communication soliciting payment may be transmitted by an imposter device 170. Alternatively or additionally, as indicated via the dashed lines in FIG. 2, payment solicitation may be received via beneficiary system 150, which may have been hacked or otherwise infiltrated using imposter device 170.

At 210, the user device 130 submits a payment request entered by a user to service provider system 110. In various versions, the payment request may be submitted using a client application 138 received via the service provider system 110 and/or using a browser that accesses a website of the service provider via the service provider system 110. The user device 130 may receive entries (into, e.g., fields of the payment request) from the user via one or more user interfaces 132 and transmit the entered values to the service provider system 110 via a network interface. At 215, the service provider system 110 may transmit a request for validation to the beneficiary system 150 and/or to the verification system 180. The validation request may include the account number for a destination account to which funds are to be transferred. At 220, the beneficiary system 150 and/or verification system 180 may validate the account number and/or other data using account data 156 and/or account data 182, and/or retrieve information on entities associated with certain accounts for comparison with values entered in the payment request.

The beneficiary system 150/verification system 180 may generate a response indicating, for example, whether the account number is associated with an account of the entity (i.e., the intended beneficiary) administering the beneficiary system 150. At 225, the response may be transmitted to the service provider system 110. If the service provider system 110 does not receive a response indicating that the account number (and/or other data) is verified, then at 230, the service provider system 110 may transmit a suitable alert to the user device 130. In some implementations, the service provider system 110 may transmit an alert if, after awaiting a predetermined time, a response indicating that the account number (and/or other data) is verified has not been received. The alert may indicate, for example, that the account number is not associated with the intended beneficiary, that validation failed, or otherwise that there is a general or specific error.

Figure 3:
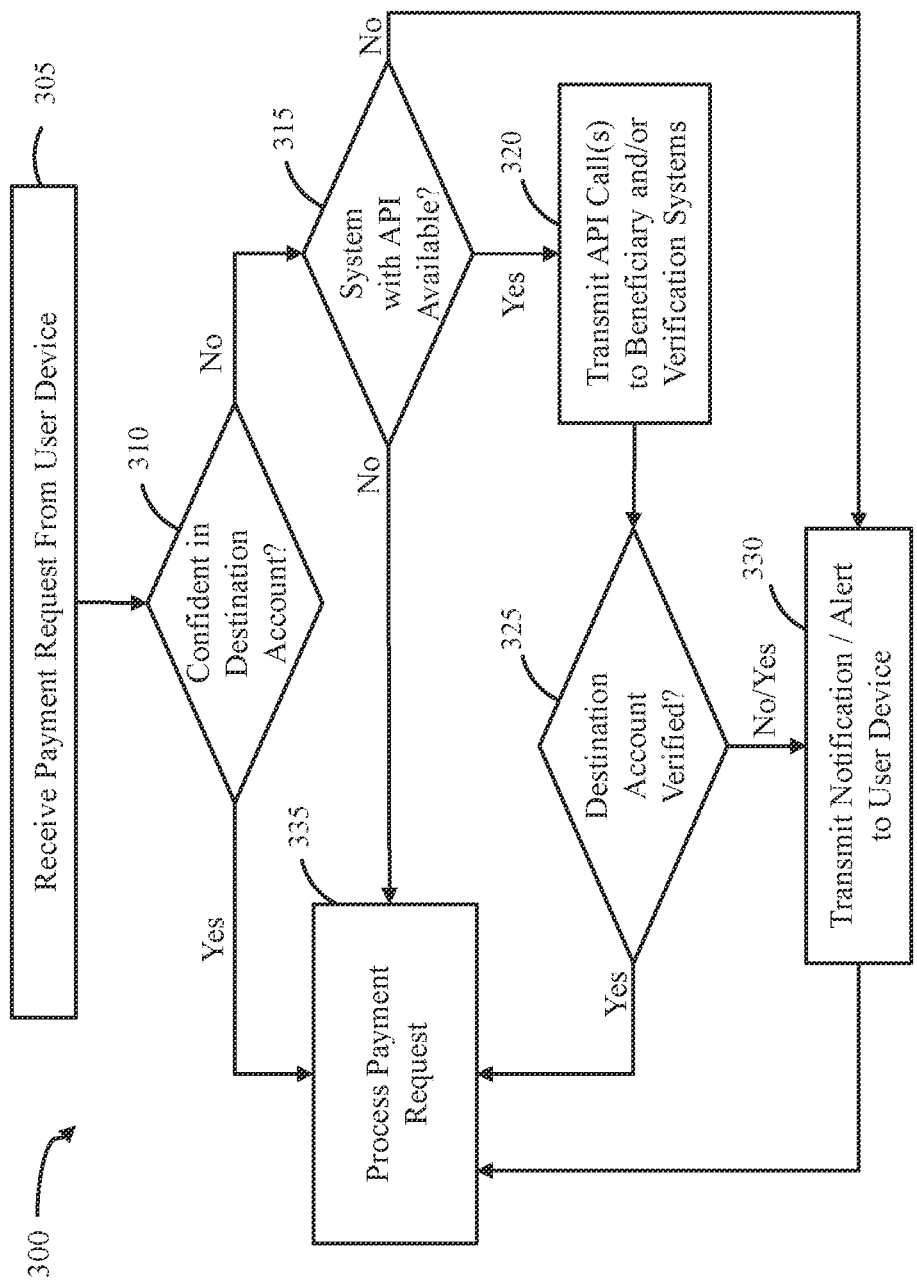
FIG. 3 depicts an example process of validating a payment request from a user, according to potential embodiments.

FIG. 3 is a flow diagram of a method 300 for processing payment requests via service provider system 110 of a service provider, according to potential embodiments. At 305, a service provider system 110 may receive a payment request from a user device 130. The payment request may be submitted via an application or website of the service provider administering the service provider system 110. The payment request may identify an intended beneficiary (e.g., by name, address, etc.) of the funds and a destination account by providing an account number for the destination account. At 310, the service provider system 110 may determine if confidence in the destination account belonging to the intended beneficiary is sufficiently high or otherwise acceptable. Confidence may be sufficiently high or acceptable if, for example, the destination account was previously verified as belonging to the intended beneficiary (e.g., in response to a previous payment request of the user requesting that funds be transferred to the destination account). Confidence may be too low or not acceptable if, for example, funds have not previously been transferred from the source account of the user to the destination account.

If the account was not previously verified or confidence is not sufficiently high that the destination account belongs to the intended beneficiary ("No"), then at 315, the service provider system 110 determines whether there is a beneficiary system 150 (and/or a verification system 180) with an API or other mechanism that allows for automated verification of account numbers. If such a beneficiary system 150/verification system 180 is available ("Yes"), then at 320, the service provider system 110 transmits an API call (or other validation request) to the beneficiary system 150. Alternatively or additionally, the service provider system 110 transmits an API call (or other request for validation) to the verification system 180.

The API call (or other validation request) may include an access token/security token to authenticate the service provider system 110. The security token may include tokenized credentials for the service provider system 110, and may have been generated by the service provider system 110 or the beneficiary system 150. The security token may be generated when, for example, the beneficiary system 150 registers with the service provider system 110, and/or when the beneficiary system 150 acquires/incorporates the API software (e.g., to implement API gateway 154) or other mechanism so that it may accept validation requests for account number verification. The API calls may also include routing and account numbers corresponding to the destination account to which funds are to be transferred.

The service provider system 110 then determines, at 325, whether the response(s) from the beneficiary system 150 and/or from the verification system 180 indicate that the account number is validated. In certain implementations, verification by either the beneficiary system 150 or the verification system 180 is accepted as validation of the account number. In other implementations, verification by both the beneficiary system 150 and the verification system 180 is required as validation of the account number. In some implementations, an assurance score may be determined. The assurance score may be proportional to confidence that the destination account belongs to the intended beneficiary. In some implementations, the assurance score may be, for example, relatively "high" when both the beneficiary system 150 and the verification system 180 have validated the account, "medium" (which may or may not be deemed acceptable) if the beneficiary system 150 (but not the verification system 180) has validated the account, and relatively "low" if the verification system 180 (but not the beneficiary system 150) has validated the account.

If (at 325) the service provider system 110 is not sufficiently assured that the destination account belongs to the intended beneficiary ("No"), then at 330, an alert or other notification is transmitted to the user device 130 to indicate, for example, that the destination account is not verified. The alert may be transmitted by the service provider system 110, by the beneficiary system 150, and/or by the verification system 180. In various implementations, if (at 325) the service provider system 110 is sufficiently assured that the destination account belongs to the intended beneficiary ("Yes"), then at 335, the service provider system 110 proceeds with processing of the payment request. In certain implementations, if (at 325) the service provider system 110 is sufficiently assured that the destination account belongs to the intended beneficiary ("Yes"), then at 330, a notification or other message may optionally be transmitted to the user device 130 to indicate, for example, that the destination account is verified. In various implementations, the optional notification may be transmitted before, at the same time as, or after proceeding with processing of the payment request (at 645). The notification may be transmitted by the service provider system 110, by the beneficiary system 150, and/or by the verification system 180. In some versions, the application or website being used to submit the payment request may assume that the destination account is verified if no alert or other notification is received (e.g., received within a predetermined amount of time, such as 5 seconds, 20 seconds, or one minute), and may proceed to ask the user to confirm the details submitted in the payment request without necessarily requiring a message that specifically confirms verification from the service provider system 110.

In various versions, the payment request may nonetheless be processed (without validation of the account), after the notification/alert at 330 is transmitted to the user device 130, if, for example, the user device 130 receives an instruction or other indication (via, e.g., user interfaces 132) that the user wishes to nonetheless proceed with the payment despite the information provided via the alert. The user may wish to proceed without validation if, for example, the user is confident in the trustworthiness of a payment solicitation, and/or if the intended beneficiary is a different but also legitimate entity (which may have, e.g., a similar name). For example, the user may identify "ABC" as the payee to make a payment to ABC, LLC (the intended beneficiary), but the service provider system 110 may (unsuccessfully) attempt to validate the account with a beneficiary system 150 of similarly-named ABC, Inc. In some implementations, processing the payment request at 335 includes the service provider system 110 initiating an automated clearing house (ACH) payment, a wire transfer, or other electronic transaction for transferring funds from the source account to the destination account or otherwise paying the beneficiary identified in the payment request.

Returning to 310, if the account was previously verified, or otherwise if the service provider system 110 is sufficiently confident that the destination account belongs to the intended beneficiary ("Yes"), method 300 may proceed to process the payment request at 335. At 315, if there is no beneficiary system 150 corresponding to the intended beneficiary with the API, and/or there is no verification system 180 with the API ("No"), method 300 may proceed to 330 to, for example, alert the user that the destination account could not be confirmed as belonging to the intended beneficiary. Alternatively or additionally, at 315, if there is no beneficiary system 150 corresponding to the intended beneficiary with the API, and/or there is no verification system 180 with the API ("No"), method 300 may proceed to process the payment request at 335. In some implementations, processing the payment request at 335 when the account has not been validated may include an additional request for confirmation by the user submitting the payment request before proceeding.

Figure 4:
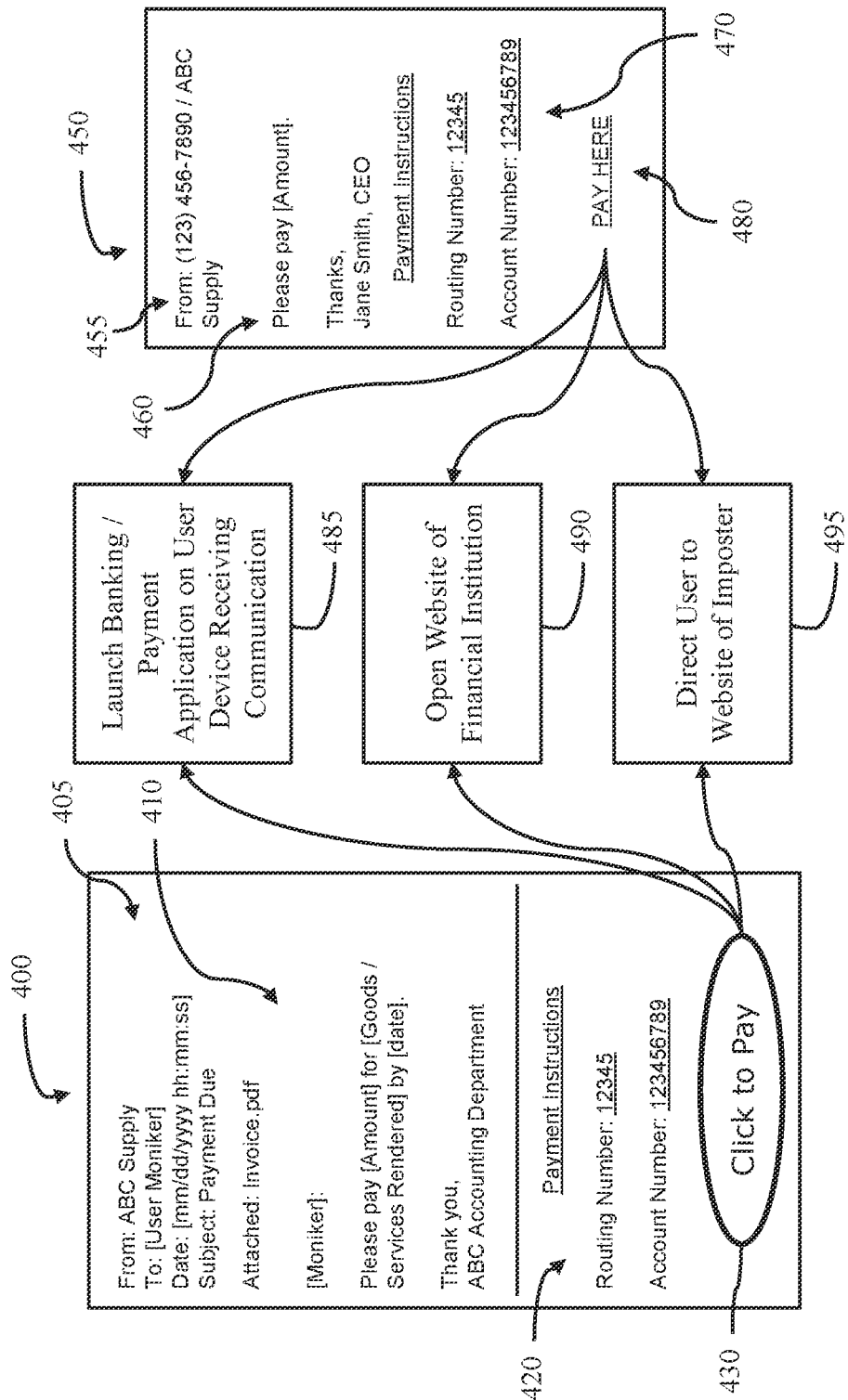
FIG. 4 depicts example communications asking for payments to an account of a scammer, according to potential embodiments.

Referring to FIG. 4, example electronic communications 400, 450 soliciting payments are provided, according to potential embodiments. Communication 400 is an example e-mail with an e-mail header 405 that identifies a sender ("From"), a recipient ("To"), a date sent/received ("Date"), and a subject. In FIG. 4, e-mail 400 is impersonating "ABC Supply" and is being sent to the user with a subject of "Payment Due." The e-mail 400 also includes an attached document titled "Invoice.pdf." The attachment may appear legitimate because it was generated by an infiltrated beneficiary system 150, or may be formatted to appear as a legitimate invoice from the impersonated entity. E-mail 400 also includes an e-mail body 410 with a message requesting that an amount be paid for goods/services by a certain date. The e-mail 400 also includes payment instructions 420, with a routing number and account number for the destination account of the imposter.

Communication 450 is an example text message, such as an SMS (short message service) message or a message transmitted via a texting application running on the imposter device 170 or the infiltrated beneficiary system 150. The message 450 includes a message header 455 that identifies a sender ("From") and a message body 460. The sender, if not an infiltrated beneficiary system 150, may spoof the beneficiary system 150 to appear legitimate. In FIG. 4, message 450 is impersonating Jane Smith, the CEO of "ABC Supply." The message 450 also includes payment instructions 470, with a routing number and account number for the destination account of the imposter.

In some implementations, the payment solicitation may include an activatable link 430/480 intended to reduce the number of steps required for the user to transfer funds to the destination account of the imposter. Selection of link 430/480 (via, e.g., one or more user interfaces 132) may result in, for example, launching of a banking or payment application on the user device 130 on which communication 400/450, respectively, is being viewed (485). Selection of link 430/480 may also result in, for example, launching of an internet browser and/or directing of the user to a website of a financial institution of the user (490). In some implementations, the activatable link, when selected, may direct the user to a website controlled by the imposter (495). The website may appear as a website of the intended beneficiary so as to deceive the user. The website may request that the user enter a routing number and an account number for a source account to initiate a transfer of funds from the source account to a destination account of the imposter, or may otherwise request confidential or sensitive information. In certain implementations, selection of link 430/480 may additionally result in the account number of the imposter to be prefilled into a payment request so that the user is not required to enter or copy and paste the account number, making the transfer of funds to the imposter easier (and thus potentially more likely to occur).

Figure 5:
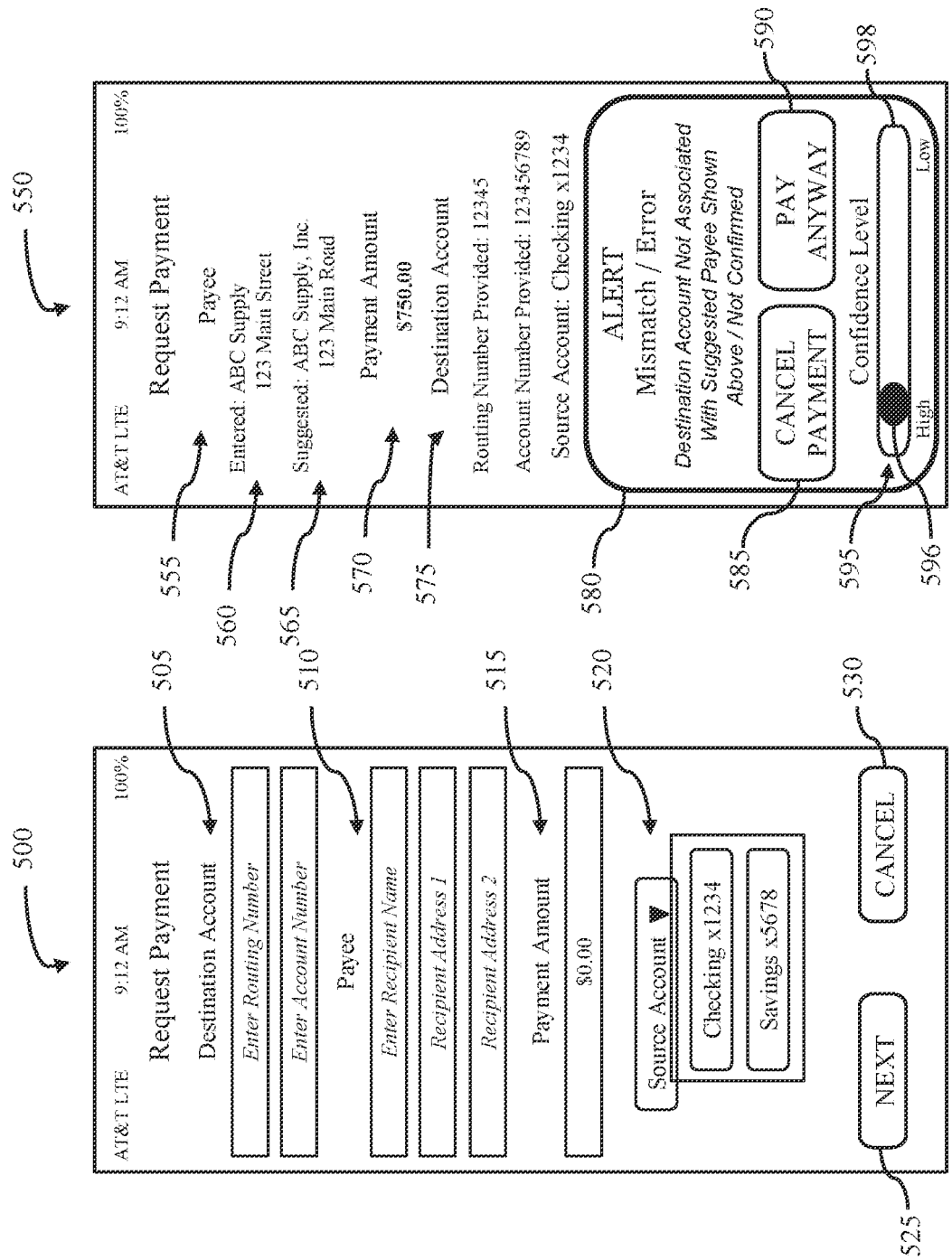
FIG. 5A is an example user interface for receiving payment requests, according to potential embodiments.
FIG. 5B is an example user interface with an example alert informing a user of a validation issue, according to potential embodiments.

Referring to FIG. 5A, after the payment solicitation 400/450 is received, an example user/graphical interface 500 may be used to submit a payment request to the service provider system 110, according to potential embodiments. Interface 500 may be presented by, for example, a client application 138 running on the user device 130, or a website of the service provider that is accessed via a browser running on the user device 130. Interface 500 allows the user to identify a destination account at 505 by entering a routing number and account number, identify a name (and address or other data) of the intended beneficiary at 510, enter a payment amount at 515, and select a source account at 520. The user may then proceed by selecting the "next" icon 525, or may cancel the request by selecting the cancel icon 530. Entries may be made via one or more user interfaces 132, such as touchscreen and/or voice prompt. In some implementations, one or more entries (such as the routing and account numbers and the payee name) may be prefilled via, for example, a payment solicitation (e.g., via link 430/480).

In various implementations, user device 130 transmits values/entries "as entered," in real time or near real time, without waiting for subsequent entries and/or selection of the next icon 525. In certain implementations, an entry in a field (e.g., routing number, account number, recipient name, and so forth) is transmitted from the user device 130 to the service provider system 110 once a certain number or type of characters have been entered, with the number or type of characters varying for different fields. For example, an entry in the routing number field can be transmitted (from the user device 130 to the service provider system 110 via the client application or webpage) once the client application or webpage detects that nine numerals have been entered by the user, corresponding with a standard length for routing numbers. In other versions, entries are transmitted from the user device 130 to the service provider system 110 character by character (i.e., as each character is entered into each field) and a number may be validated once an account number is potentially received (e.g., if the correct/standard number and type of characters has been received). In certain implementations, an entry in a field is transmitted once a user moves to another field. For example, account number is transmitted once the user enters a number in the account number field and selects the routing number (or other) field for a subsequent entry. In some implementations, entries are transmitted in batches. For example, the routing number and account number may be transmitted (once both have been entered) as a first batch corresponding to information identifying the destination account, and payee name and payee address may be transmitted (once both have been entered) as a second batch corresponding to information identifying the payee. If entries are changed by the user, the revised values may be transmitted from the user device 130 to the service provider system 110 (via, e.g., client application 138 running on the user device 130) as the revised values are received.

Following selection of the next icon 525, the client application or website may present a page/screen such as example user/graphical interface 550 depicted in FIG. 5B. User interface 550 may present some or all of the information received via user interface 500 for review/confirmation. In a payee information section 555, user interface 550 may present the payee name, as entered, at 560. Alternatively or additionally, user interface 550 may, at 565, present a different payee name as interpreted/suggested. The client application/website or the service provider system 110 may analyze the payee name and/or the payee address, provided by the user at 510, to identify the interpreted/suggested payee, which may (if different from payee name at 560) be an intended beneficiary whose name may have been misspelled, incomplete, etc., when entered at 510. In certain implementations, the suggested payee name at 565 may be the closest identifiable entity with a beneficiary system 150 that is equipped with the API or other validation mechanism. In some cases, the imposter may have provided an incorrect name for the entity being impersonated, or the payee name entered may have been a name used in the course of business (e.g., a d/b/a) that is different from the official name associated with the destination account. Interface 550 may provide, at 570, the payment amount entered via interface 500 at 515. Interface 550 may also provide, at 575, the destination account information entered via interface 500 at 505.

The service provider system 110 (and/or the user device 130 in other potential implementations), once data on the payment request has been entered/received, validates the information. In some cases, it may be determined that the destination account does not belong to (or is otherwise not associated with) the payee entered (560), or, if different, the payee identified as potentially being the intended beneficiary (565) based on payee information provided. The service provider system 110 may transmit to the user device 130 a message or other indication that there is an error (or, in other implementations, the client application 138 may generate the message or other indication if the user device 130 validated the beneficiary without involving the service provider system 110). When such a message/indication is received, interface 550 may present an alert 580 to caution the user about the payment request. The message/indication may be transmitted if, for example, no response was received from the beneficiary system 150 and/or from the verification system 180, or if the beneficiary system 150 and/or the verification system 180 responded that the account number is not valid.

In some cases, failure to validate the destination account information submitted by the user is not necessarily due to a scam. For example, the entity believed to be the intended beneficiary may not actually be the intended beneficiary. This may result if, for example, the payee has a name similar to the entity believed to potentially be the intended beneficiary. Failure to validate may also be due to a mistake (e.g., the user inadvertently entered incorrect destination account information). Accordingly, in certain implementations, interface 550 may provide a cancel payment icon 585 to allow the user to cancel the payment request. Interface 550 may also provide a pay anyway icon 590, to allow the user to continue with the payment if, for example, the user is sufficiently confident that the destination account does belong to the intended beneficiary.

Figure 6:
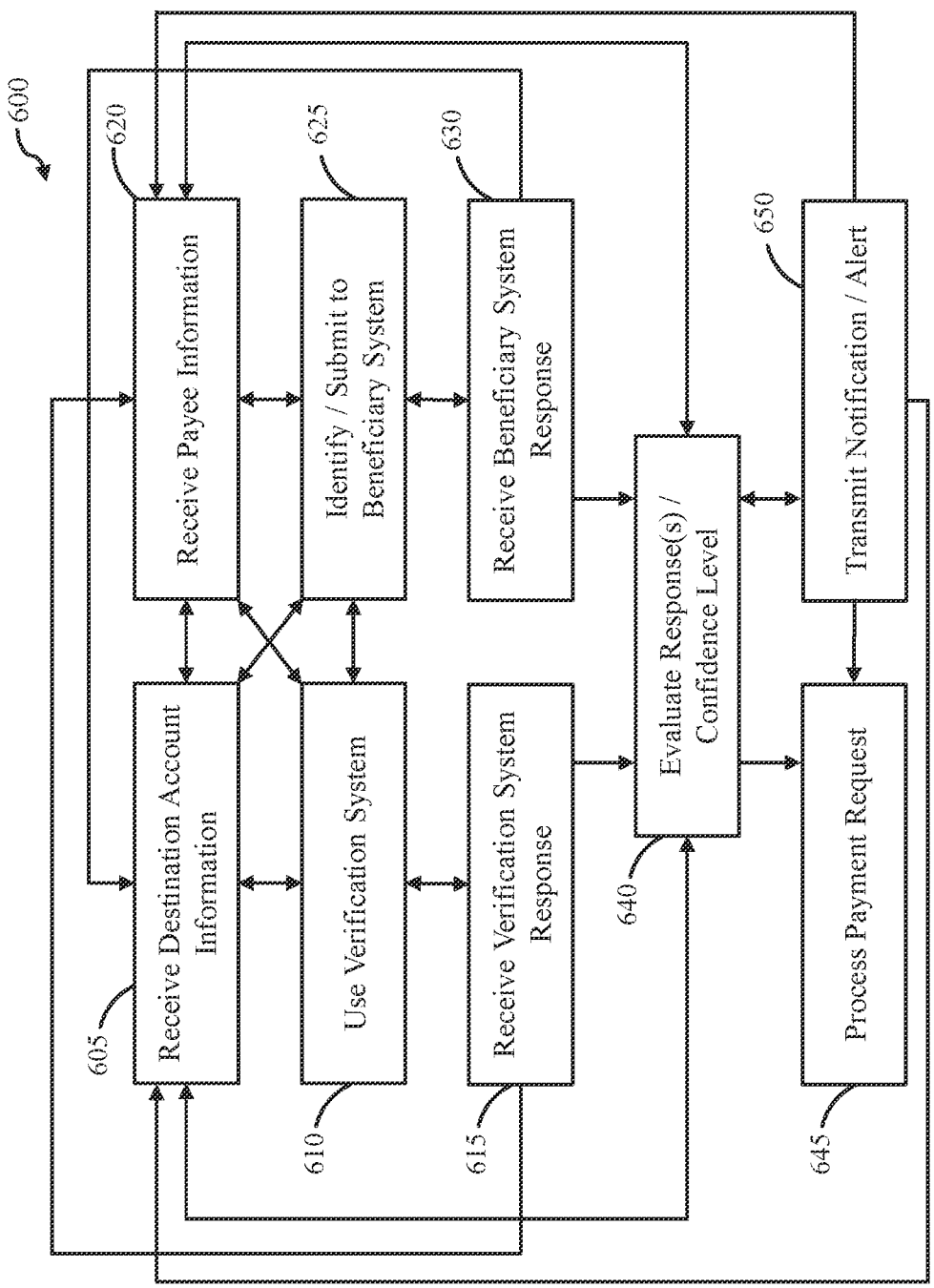
FIG. 6 depicts an example process of validating a payment request of a user while information is being entered by the user, according to potential embodiments.

FIG. 6 is a flow diagram of an example method 600 for validating destination accounts in the background as information is being entered by a user in real time or near real time, according to potential embodiments. At 605, the service provider system 110 (e.g., via a client application 138 running on, or a website accessed using, user device 130) receives destination account information. The fields for destination account information may be placed at the top of the page (e.g., at 505 in interface 500) to encourage the user to identify the destination account sooner rather than later to allow validation of the account number to begin earlier in the payment request submission process. The user device 130 may transmit the account number to the service provider system 110 before the payment request is completed, or before additional information is entered into other fields. In some versions, once the destination account number and the routing number (or the account number without the routing number) have been received, at 610, the service provider system 110 may transmit a validation request (via, e.g., an API call) to validate the account via the verification system 180. If step 610 occurs before the payee name has been entered by the user, the verification system 180 may be used to discover what account owner is associated with the account. For example, the verification system 180 may have account data 182 (in a ledger, database, etc.) with a list of account numbers and owners, and the verification system 180 may accept an account number from the service provider system 110 and, at 615, return to the service provider system 110 a response identifying the owner or other entity associated with the account/account number. The payee name, once received from the user at 620, may be compared with the owner or other entity identified in the response from the verification system 180 to validate the account number.

Once the payee information (e.g., payee name) is entered and received by the service provider device 110 (620), the service provider system 110 may, at 625, identify a beneficiary system 150 and transmit a validation request (e.g., an API call) to the identified beneficiary system 150. The service provider system 110 may, at 630, receive a response from the beneficiary system 150. The response may vary depending on what data was included with the validation request. For example, if the service provider system 110 did not transmit an account number, the validation request may be treated as a request for a current list of account numbers associated with the beneficiary. If an account number was included with the validation request, the beneficiary system 150 may respond with an indication that the account number is associated with the beneficiary (e.g., "yes," "valid," "confirmed," and so forth) or that the account number is not associated with the beneficiary (e.g., "no," "invalid," and so forth).

Once one or more responses have been received at 615 and/or 630, the service provider system 110 (and/or the user device 130, in some implementations) may, at 640, evaluate the responses to determine whether an alert is warranted or otherwise whether confidence in the validity of the account number is at an acceptable level. In various implementations, the evaluation at 640 may require one response indicating validation was successful, or the evaluation at 640 may require two (or more) responses indicating validation was successful, for confidence to be at the acceptable level. In some implementations, the number (and/or sources) of validations may, for example, be positively correlated with the dollar amount to be transferred, such that the higher the dollar amount, the higher the threshold for acceptability of confidence level in the validity of the account number. If process 640 provides enough confidence in the validity of the account number, at 645, the payment request may proceed to processing, leading to initiation of a funds transfer. If process 640 does not provide sufficient assurance, the service provider system 110 may at 650 transmit an alert to the user device 130. Optionally, in some versions, the service provider system 110 may transmit a message or other notification to the user device 130, if process 640 provides sufficient assurance, to indicate, for example, that the account number is deemed valid. In certain implementations, the alert or other notification may indicate that validation was not successful, or that validation remains pending (if, e.g., the service provider system 110 is still awaiting a response from, for example, the beneficiary system 150 and/or one or more verification systems 180 before a confidence threshold is reached).

In certain versions, after an alert or other notification (indicating, e.g., that validation of the account number is pending, validation is unsuccessful, or that confidence in the account number is low) has been received by the user device 130 at 650, the user may indicate that he or she nonetheless wishes to proceed with the payment request (e.g., by activating a "pay anymay" icon 590), after which the service provider system 110 may proceed with processing of the payment request at 645. In some versions, the user may alternatively or additionally be allowed to indicate a level of confidence in the account number entered by, for example, selecting or otherwise indicating (e.g., via one or more user interfaces 132 of user device 130) a confidence level in the account number entered (e.g., "high" confidence level, "low" confidence level, etc.). In various implementations, the user may indicate his or her confidence in the entered account number via alert 580 in FIG. 5B. The user may indicate his or her confidence in the account number by, for example, interacting with a slidable "confidence" meter 595, which may allow a user (by, e.g., moving his or her finger on a touchscreen display) to slide a selector 596 within region 598 to indicate higher confidence (by moving selector 596 towards the left in the version shown in FIG. 5B) or lower confidence (by moving selector 596 towards the right in the version shown in FIG. 5B). The user may indicate his or her confidence level in another way, such as a drop-down menu, selectable/activatable "high confidence" and "low confidence" icons, voice input, and/or other user input mechanism. The selections and/or other indications may be received, for example, via the application or website, and may be transmitted to the service provider computing system 110. Subsequently, at 640, the service provider computing system 110 may re-evaluate confidence in the account number to determine whether confidence is now considered to be sufficiently high with the additional user input. For example, if the alert was transmitted by the service provider system 110 because only the beneficiary system 150, or only the verification system 180, provided validation (where both were required for reaching a confidence threshold), the user's confirmation that he or she would like to proceed, or indication that he or she is confident in the account number, may "tip the scales" in favor of validation of the account number. Consequently, in some implementations, one or more user responses (in addition to potential responses at 610 and 625) may be a factor that weighs in favor (e.g., user selects "pay anyway" 590 or indicates that his or her confidence in the account number is high via, e.g., confidence meter 595) or against (e.g., the user indicates that his or her confidence in the account number is low via, e.g., confidence meter 595) validation of the account number. Following re-evaluation at 640, another notification may be transmitted at 650 (e.g., a message indicating that the account number is deemed validated, or an alert indicating that confidence nonetheless remains low and/or recommending that the user contact the intended beneficiary or otherwise check the account number). Alternatively or additionally, processing of the payment request may be initiated at 645.

As suggested by the (double-headed) arrows, the various steps of process 600 may be performed and re-performed in varying order, and different steps may be performed in parallel or serially. FIG. 6 does not exhaustively depict every sequence or order in which steps may be performed. For example, after an alert is transmitted at 650, the service provider 110 may receive updated destination account information (605) or updated payee information (620) if the user returns to, for example, user interface 500. Process 600 may begin with either receipt of the destination account information at 605 or receipt of the payee information at 620, and may next proceed to either use of the verification system 180 (610) or the beneficiary system (625), or both. In some implementations, the payee information and destination account information (or subsets thereof) may be transmitted to the service provider system 110 together as a batch, allowing use of both the verification system 180 (610) and the beneficiary system 150 (625) concurrently.

Once the payee name has been entered and received by the service provider system 110 (620), process 600 may proceed to identifying a beneficiary system 150 and transmitting a validation request to the beneficiary system 150 (625). The service provider 110 may optionally wait to receive the payee address (or other information) for use in identifying the correct beneficiary system 150, but need not await the payee address. With only the payee name, the service provider system 110 may transmit a request for valid account numbers, and the beneficiary system 150 may respond (630) with a current list of valid account numbers associated with the beneficiary administering the beneficiary system 150. The list of valid account numbers may be compared with the destination account number once the destination account number has been received by the service provider system 110 (605) to determine whether the account number entered is associated with the beneficiary. The user may have been entering the destination account information while the service provider system 110 and beneficiary system 150 were in communication. If/once the account number is also available, the service provider system 110 may also include the account number in the transmission to the beneficiary system 150, and the beneficiary system 150 may respond (630) with an indication as to whether the account number is valid (without identifying other valid account numbers).

In some implementations, in the interest of time, or if the beneficiary system 150 is unavailable or is otherwise not responding to a validation request, an account number received in a payment request may be compared with a prior list of valid account numbers received from the beneficiary system 150. If the account number is not in the list, the service provider system 110 may provide a "softer" alert to inform the user that the account number may or may not be valid, rather than a "harder" alert that informs the user that the account number was confirmed not to be associated with the intended beneficiary. Because the prior list may be outdated, confidence in the validation of the account number may be lower than if the list were up-to-date. In certain implementations, the older the list, the lower the confidence in the validation. In some implementations, an "old" list may be consulted concurrently with a validation request being transmitted to the beneficiary system 150 and/or the verification system 180, in case the beneficiary system 150/verification system 180 takes longer than desired to respond to the service provider system 110.

Consequently, both the beneficiary system 150 and the verification system 180 may be used without awaiting a response from the other, as soon as a relevant piece of information is available that may be useful for validation. The service provider system 110 may, for example, transmit a request to the beneficiary system 150 immediately or shortly after the beneficiary system 150 is identified (e.g., using the payee name, the payee address, and/or other identifying information) without more information, after the destination account and/or routing number has been received, and so forth. Similarly, the service provider system 110 may, concurrently or consecutively, transmit a request to the verification system 180 immediately or shortly after the account number is known (to, e.g., receive the name of the associated entity), once the payee name is known (to, e.g., receive the account numbers associated with the payee), and so forth.

In various implementations, a response from one of the verification system 180/beneficiary system 150 may be used for validation via the other of the verification system 180/beneficiary system 150. For example, the verification system 180 may, in response to a validation request identifying an account number, respond with a payee name. The service provider system 110 may use the payee name from the verification system 180 to identify a beneficiary system 150 associated with the payee, and transmit a validation request (with the payee name and account number) to the beneficiary system 150 to validate the account.

In some implementations, validation requests may include the payment amount or other data (such as an identifier assigned to the user by the beneficiary to identify the user in the records of the beneficiary). The service provider system 110 may, in certain implementations, evaluate the legitimacy of a payment by requesting that the beneficiary system 150, for example, confirm whether the beneficiary system 150 communicated a request for the amount in the payment request to the user. If the beneficiary system 150 indicates that the user owes a different amount, or that the beneficiary system 150 did not transmit a request for a payment (for any amount, or for that amount) to the user, the service provider system 110 may determine that the payment request is more likely to have arisen from an attempted scam.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for providing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A service provider system comprising one or more processors configured to:
  receive, from a user device, a payment request submitted by a user via a payment application or browser running on the user device, the payment request including an account number;
  determine, based on the payment request, that at least two responses indicating a successful validation are required to permit the payment request;
  responsive to determining that at least two responses are required:
    identify a beneficiary system of an intended beneficiary based at least in part on the payment request;
    submit a first API call to the beneficiary system, the first API call including the account number in the payment request; and
    transmit a second API call to a verification system, the second API call including the account number in the payment request;
  provide, to the user device, a first notification that indicates the service provider system is awaiting verification;
  receive, from the beneficiary system, a first response indicating whether the account number is associated with the intended beneficiary;
  receive, from the verification system, a second response indicating at least a name associated with the account number in the payment request;
  determine, based on the first response and the second response, a score indicative of a likelihood that the account number in the payment request is associated with the intended beneficiary; and
  in an instance in which the score indicates the account number is not associated with the intended beneficiary, transmit, to the user device, an alert in response to the payment request.

2. The system of claim 1, wherein the first notification comprises a button that, when interacted with, causes the user device to transmit a request to the service provider system to permit the payment request in lieu of validation.

3. The system of claim 1, wherein the one or more processors are further configured to determine that the first response indicates that the account number is not associated with the intended beneficiary, and generate the alert so as to indicate that the account number in the payment request is not associated with the intended beneficiary.

4. The system of claim 1, wherein the one or more processors are further configured to, in a second instance in which the account number is associated with the intended beneficiary, transmit, to the user device, a notification that indicates that the account number in the payment request is associated with the intended beneficiary.

5. The system of claim 1, wherein the one or more processors are further configured to include an authentication credential of the service provider system with the first API call, wherein the authentication credential is a security token generated by at least one of the beneficiary system and the service provider system for authentication of the service provider system with the beneficiary system.

6. The system of claim 1, wherein the payment request is a request to transfer funds from a source account to a destination account associated with the account number, and wherein the one or more processors are further configured to determine that the destination account is not sufficiently certain to belong to the intended beneficiary before submitting the first API call to the beneficiary system.

7. The system of claim 6, wherein the one or more processors are further configured to determine that the destination account is not sufficiently certain to belong to the intended beneficiary based at least in part on a determination that funds have not previously been transferred from the source account to the destination account in a prior payment request.

8. The system of claim 1, wherein the payment request provides identification information for a recipient, and wherein the one or more processors are further configured to identify the intended beneficiary based at least in part on similarity or match between the identification information for the recipient and identification information for the intended beneficiary.

9. The system of claim 8, wherein the recipient identification information includes a recipient name and a recipient address, and wherein the one or more processors are further configured to identify the intended beneficiary based on similarity or match between the recipient name and an intended beneficiary name, and similarity or match between the recipient address and an intended beneficiary address.

10. The system of claim 1, wherein the one or more processors are further configured to determine that the first response received from the beneficiary system indicates that the account number is not associated with the intended beneficiary, and to indicate, in the alert transmitted to the user device, that the account number in the payment request is not associated with the intended beneficiary.

11. A method of preventing fraud, the method comprising:
  receiving, from a user device of a user, a payment request submitted by the user via a payment application or browser running on the user device, the payment request including an account number;

determining, based on the payment request, that at least two responses indicating a successful validation are required to permit the payment request;
responsive to determining that at least two responses are required:
identifying, based at least in part on the payment request, a beneficiary system;
transmitting a first API call to the beneficiary system, the first API call including the account number received in the payment request;
transmitting a second API call to a verification system, the second API call including the account number in the payment request;
providing, to the user device, a first notification that indicates a service provider system is awaiting verification;
receiving, from the beneficiary system and in response to the first API call, a first response indicating whether the account number is associated with a recipient identified in the payment request;
receiving a second response from the verification system, wherein the second response indicates at least a name associated with the account number in the payment request;
determining, based on the first response and the second response, a score indicative of a likelihood that the account number in the payment request is associated with the recipient; and
in an instance in which the score indicates the destination account is not associated with the recipient identified in the payment request, transmitting to the user device an alert to be presented via the payment application or browser.

12. The method of claim 11, wherein the first notification comprises a button that, when interacted with, causes the user device to transmit a request to the service provider system to permit the payment request in lieu of validation.

13. The method of claim 11, further comprising determining that the first response from the beneficiary system indicates that the account number is not associated with the recipient, and generating the alert so as to indicate that the account number identified in the payment request is not associated with the recipient.

14. The method of claim 11, further comprising, in a second instance in which the account number is associated with the recipient identified in the payment request, transmitting to the user device a notification that indicates that the account number is associated with the recipient, and informing the user via the payment application or browser that the account number is associated with the recipient.

15. The method of claim 11, wherein the payment request is submitted in response to a communication transmitted to the user device, wherein the communication requested funds and included the account number for the destination account.

16. The method of claim 15, wherein the communication was transmitted to the user device by a device of an entity impersonating the recipient.

17. The method of claim 15, wherein the payment request is initiated via a link in the communication, wherein the link causes the user device to launch the payment application or direct the user to a website and prefills the account number into a payment request page presented via the payment application or the website.

18. The method of claim 11, further comprising determining whether funds have previously been transferred from the source account to the destination account in a prior payment request, wherein the beneficiary system is identified for transmission of the first API call in response to a determination that funds have not previously been transferred from the source account to the destination account.

19. A method of avoiding unintended transactions, the method comprising:
receiving, from a user device of a user associated with a source account, an account number for a destination account to receive funds and an identification of an intended beneficiary, the account number and the intended beneficiary having been entered by the user into fields of a payment request, wherein at least one of the account number and the intended beneficiary is transmitted by the user device while at least one field in the payment request is unfilled;
determining, based on the payment request, that at least two responses indicating a successful validation are required to permit the payment request;
responsive to determining that at least two responses are required:
transmitting a validation request to a beneficiary system corresponding to the intended beneficiary, the validation request including the account number, wherein the validation request is a first API call to the beneficiary system; and
transmitting a second API call to a verification system, the second API call including the account number in the payment request;
providing, to the user device, a first notification that indicates a service provider system is awaiting verification, the first notification comprising a button that, when interacted with, causes the user device to transmit a request to the service provider system to permit the payment request in lieu of validation;
receiving a first response from the beneficiary system, wherein the first response indicates whether the destination account is associated with the intended beneficiary;
receiving a second response from the verification system, wherein the second response indicates at least a name associated with the account number in the payment request;
determining that a score generated based on the first response and the second response indicates that the destination account is likely not associated with the intended beneficiary; and
in response to determining that the score indicates that the destination account is likely not associated with the intended beneficiary, transmitting a notification to the user device to cause the user device to present an alert to the user to indicate a failure to validate the destination account.

20. The method of claim 19, wherein the payment request is initiated via a link in the electronic solicitation, wherein the link causes the user device to (i) launch a payment application, or (ii) present a payment website via an Internet browser.

* * * * *